July 2, 1957 S. AMBROSE 2,797,932
PROTECTIVE COVER AND ARTICLE RETAINING TRAY
FOR VEHICLE FENDERS
Filed May 27, 1955 2 Sheets-Sheet 1
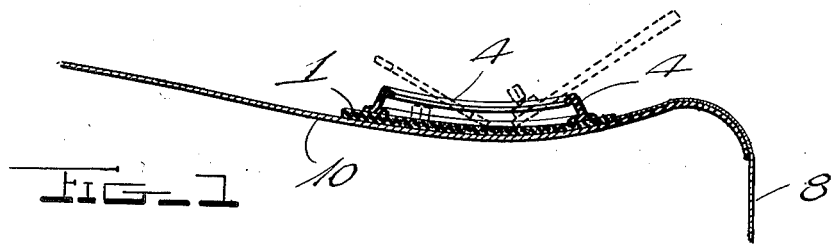
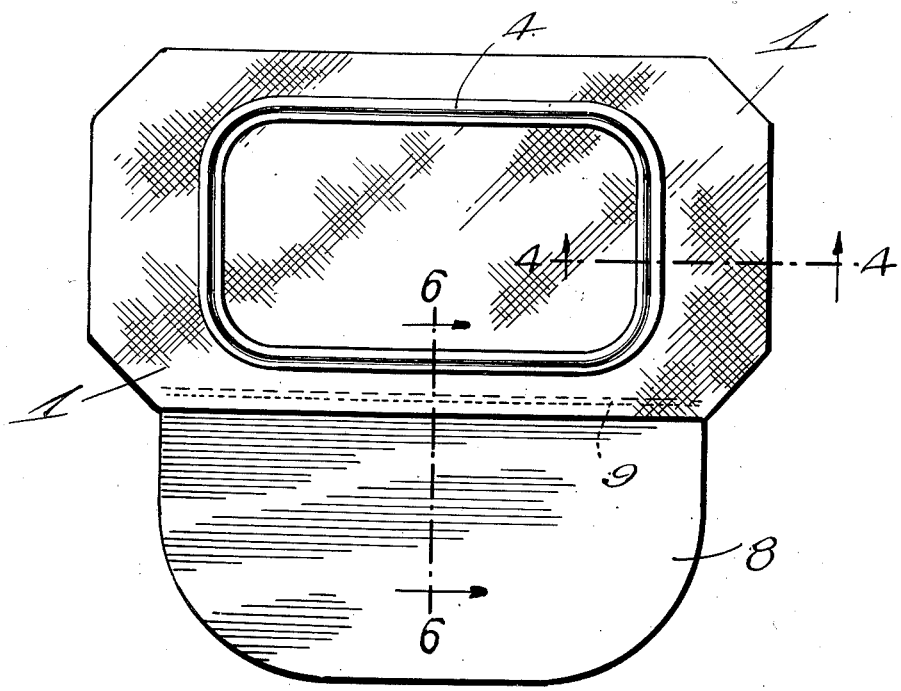
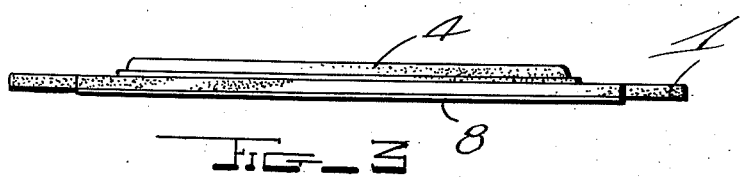
INVENTOR
Steve Ambrose,
BY Linton and Linton
ATTORNEYS

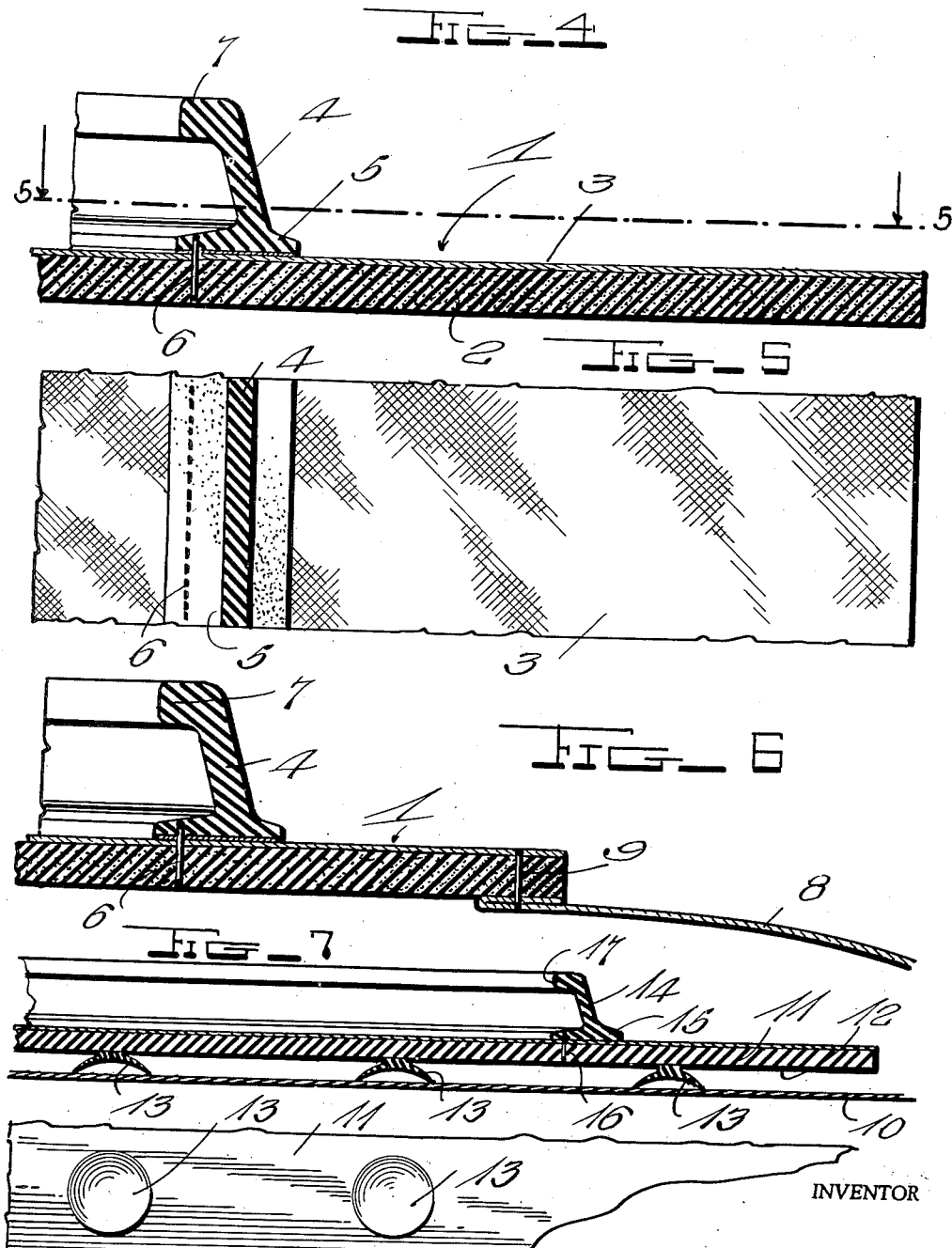

United States Patent Office 2,797,932
Patented July 2, 1957

2,797,932

PROTECTIVE COVER AND ARTICLE RETAINING TRAY FOR VEHICLE FENDERS

Steve Ambrose, Wheeling, W. Va.

Application May 27, 1955, Serial No. 511,609

1 Claim. (Cl. 280—150)

The present invention is concerned with a fender protector and article tray.

The principal object of the present invention is to provide a flexible tray capable of being positioned upon various shaped vehicle fenders and which tray will form a protective covering for the fender and also serve as a retainer for articles such as tools, nuts, bolts and the like being used in the maintenance of the vehicle.

A further and important object of the invention is to provide a resilient and flexible cover for being placed upon a vehicle fender and having a surface which tends to retain the cover upon the fender and which cover will protect the fender from impact with tools placed upon the cover and also from contact with grease, oil and the like.

Further objects of the present invention will be in part obvious and in part pointed out in the following detailed description of the accompanying drawings, wherein, Fig. 1 is a cross sectional view of one form of the present protective tray as mounted upon a vehicle fender.

Fig. 2 is an enlarged top elevation of the present device.

Fig. 3 is a side view of the present protective tray as viewed from the bottom of Fig. 2.

Fig. 4 is a greater enlarged detailed sectional view of the tray taken on line 4—4 of Fig. 2.

Fig. 5 is a sectional view taken on line 5—5 of Fig. 4.

Fig. 6 is a further enlarged detailed sectional view taken on line 6—6 of Fig. 2.

Fig. 7 is a sectional view of a portion of a modified form of the present tray; and, Fig. 8 is a bottom view of a portion of the tray of Fig. 7 showing the attached suction cups.

Referring now more particularly to the accompanying drawing wherein like and corresponding parts are designated by similar reference characters, numeral 1 refers to a sheet of a flexible resilient material, which for example may be a sheet of rubber or a sponge rubber, or as indicated at Fig. 4 a sheet of sponge rubber having a soft non slipping bottom face 2 and a coating 3 on the upper face thereof of an oil and grease repellent material, such as a plastic or a smoother rubber.

An endless rim 4 of a flexible material such as rubber has a base 5 attached by stitching or the like 6 to sheet 1 and an inwardly extending flange 7 formed with its top free edge.

A sheet 8 of flexible material such as rubber, plastic or the like which is also water, oil and grease repelling is attached by stitching or the like 9 to sheet 1 along the longitudinal edge thereof.

As shown in Fig. 1, the tray can be mounted upon various forms of vehicle fenders, as represented as an example only, by the section of a fender 10 in Fig. 1. The sheet 1 is placed upon a top of the fender and will tend to remain thereon due to the relatively soft bottom 2 of said sheet whereupon the rim 4 will extend upwardly from said sheet 1 whereupon tools, nuts and the like as indicated in dotted lines of Fig. 1 can be placed within the rim and held thereby until required for further use. The resilient sheet 1 prevents the fender 10 from being marred by the tools regardless of how carelessly they are placed upon sheet 1. Further, sheets 1 and 8 being of an oil and grease repellent material prevents such materials from reaching the fender and yet the oil or greases can be readily wiped from these sheets from time to time as desired.

In Figs. 7 and 8 there is shown a rubber sheet 11 having a bottom 12 from which extend a plurality of resilient semi-circular suction cups 13 which may be formed with the sheet 12 or attached thereto by any known means. Sheet 12 further has a circular rim 14 whose flat base 15 is attached to sheet 11 by stitching 16 and extends from the opposite side to the cups 13. The free end of rim 14 extends inwardly providing a flange 17.

In this modified tray the suction cups 13 are positioned on the fender 10 and when pressed downwardly create a vacuum in each cup which tends to adhere the cups to said fender whereby the tray will be detachably retained thereon. Heavy objects such as wrenches, hammers or other tools can be placed within rim 14 and will be prevented thereby from sliding from the tray and yet the sheet 11 and cup 13 prevent fender 10 from being damaged by contact with these tools as the sheet and cups will absorb the shock when said tools are placed upon the tray.

The present tray is capable of considerably modification and such changes thereto as come within the scope of the appended claim are deemed to be a part of the present invention.

I claim:

A protective covering and article retaining tray for being mounted on vehicle fenders comprising a sheet of a flexible resilient material having a soft non-slipping bottom face, a rim of a flexible material consisting of a flat base mounted on and connected to said sheet, an endless wall extending from said base substantially perpendicular thereto forming an article retaining pocket and a flange extending laterally from the free end of said wall all as one piece of elongated endless material.

References Cited in the file of this patent
UNITED STATES PATENTS

| | | |
|---|---|---|
| 1,372,846 | Temple | Mar. 29, 1921 |
| 2,119,072 | Cohen | May 31, 1938 |
| 2,460,394 | Peatross | Feb. 1, 1949 |
| 2,659,523 | Comber | Nov. 17, 1953 |